(12) United States Patent  
Post

(10) Patent No.: US 7,610,640 B2
(45) Date of Patent: Nov. 3, 2009

(54) RESCUE UNDERLAY FOR MATTRESSES

(75) Inventor: Harald Post, Nettetal (DE)

(73) Assignee: Ecolab Inc., St. Paul, MN (US)

( * ) Notice: Subject to any disclaimer, the term of this patent is extended or adjusted under 35 U.S.C. 154(b) by 719 days.

(21) Appl. No.: 10/649,152

(22) Filed: Aug. 27, 2003

(65) Prior Publication Data

US 2005/0172406 A1    Aug. 11, 2005

(30) Foreign Application Priority Data

Aug. 27, 2002 (DE) .............................. 202 13 369 U
Feb. 14, 2003 (DE) .............................. 203 02 487 U
Feb. 21, 2003 (DE) .............................. 203 02 928 U

(51) Int. Cl.
*A61G 1/04* (2006.01)

(52) U.S. Cl. ................... 5/626; 5/628; 294/140

(58) Field of Classification Search .......... 5/625–629, 5/417, 420, 652; 128/869, 870; 294/140, 294/151, 152, 165
See application file for complete search history.

(56) References Cited

U.S. PATENT DOCUMENTS

| 3,986,505 | A | | 10/1976 | Power |
| 4,124,908 | A | | 11/1978 | Burns et al. |
| 5,014,724 | A | | 5/1991 | Miller ................... 128/870 |
| 5,150,487 | A | | 9/1992 | Hemphill |
| 5,271,110 | A | * | 12/1993 | Newman ............... 5/81.1 R |
| 5,317,770 | A | * | 6/1994 | Sakurai ................. 5/625 |
| 5,582,893 | A | * | 12/1996 | Böttger et al. ........ 428/86 |
| 5,860,174 | A | * | 1/1999 | Failor ................... 5/81.1 HS |
| 6,363,936 | B1 | | 4/2002 | McCormick |
| 6,367,582 | B1 | | 4/2002 | Derby |

FOREIGN PATENT DOCUMENTS

| DE | 88 14 414.3 | 11/1988 |
| DE | 29507662 | 5/1995 |
| DE | 29717879 | 11/1997 |
| DE | 20213369 | 1/2003 |
| EP | 0067070 | 12/1982 |

(Continued)

OTHER PUBLICATIONS

Arbeitsgruppe Wirkerei, "http://www.titv-greiz.de/deu/flaeche.htm", Sep. 30, 2004, 2pages.
Abstandsgewebe, http://www.haufler-iv.de/abstandsgewebe.htm, Aug. 18, 2002, 1 page.
Arbeitsgruppe Wirkerei, http://www.titv-greiz.de/deu/agwirker.htm, Aug. 18, 2002, 1 page.

(Continued)

*Primary Examiner*—Tara Mayo-Pinnock
(74) *Attorney, Agent, or Firm*—Andrew D. Sorensen

(57) ABSTRACT

A rescue underlay for mattresses (1), comprising a substantially rectangular underlay mat (4) consisting of a plastic flat material which has a high tensile strength, the dimensions of which approximately correspond with the dimensions of the mattress (1), pull loops (5) or the like, patient securing belts (6) and, optionally, mattress retaining bands (7) or the like, all attached to the underlay mat (4). This particular rescue underlay has an underlay mat 4 which has a flat material that itself is providing a spring travel. In a preferred embodiment the plastic flat material of the underlay mat 4 is a spacer woven fabric or, in particular, a spacer knitted fabric. A mattress can be separately combined with such rescue underlay or can even be integrated with a rescue underlay to form a rescue mattress.

26 Claims, 6 Drawing Sheets

FOREIGN PATENT DOCUMENTS

| | | |
|---|---|---|
| EP | 0529671 | 3/1993 |
| FR | 2692779 | 12/1993 |
| GB | 1 434 832 | 5/1973 |
| GB | 1 434 832 | 5/1976 |
| JP | 09154888 | 6/1997 |
| WO | WO87/04614 | 8/1987 |
| WO | WO0074785 | 12/2000 |

OTHER PUBLICATIONS

Arbeitsgruppe / Technikfelder, http://www.titv-greize.de/deu/aguebers.htm. Aug. 18, 2002, 1 page.

Wilkommen, http://www.titv-greiz.de/start.htm, Aug. 18 2002, 1 page.

LookMa® Paraphernalia, http://lookma.de/starseite/Produkte/Materiallen/materiallen.html, May 23, 2002, 2 pages.

* cited by examiner

Figure 4a
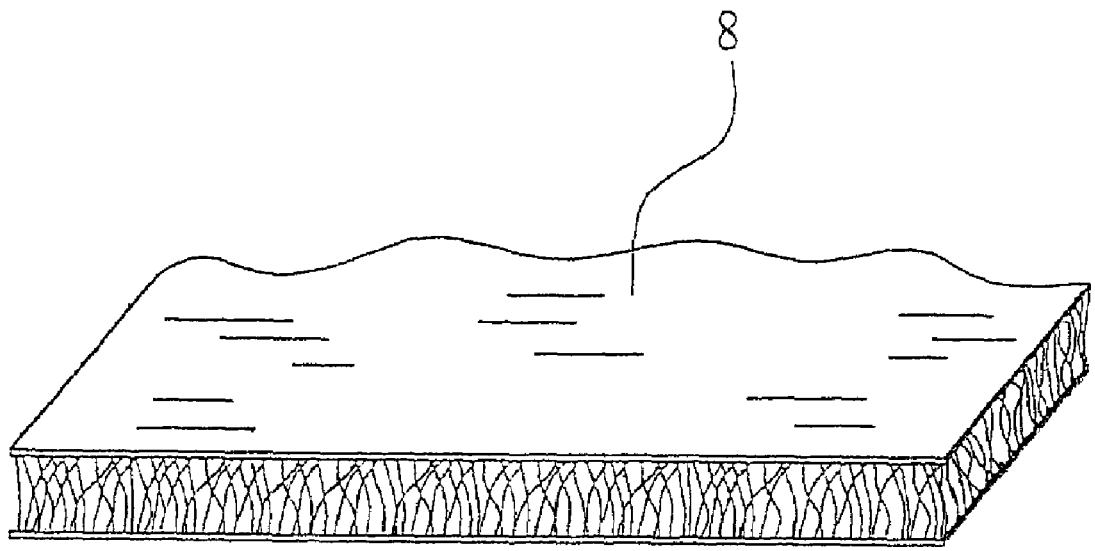
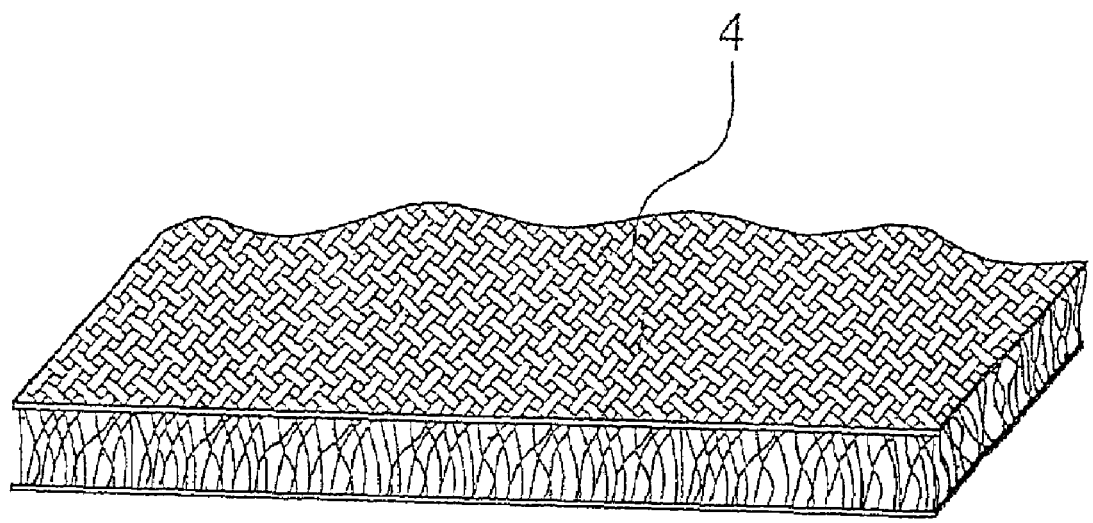
Figure 4b

RESCUE UNDERLAY FOR MATTRESSES

FIELD OF THE INVENTION

The invention relates to a rescue underlay for mattresses with the features of the introductory part of claim 1.

BACKGROUND

Rescue underlays for mattresses of the usual kind have a double function. On the one hand such a rescue underlay is, by its underlay mat, a mattress protective cover for pressure relief of the mattress at the underside. On the other hand, the rescue underlay serves in the event of a catastrophe for rapid evacuation of a reclining patient. This applies to hospitals, homes for the elderly, nursing wards, etc.

Rescue underlays of the usual kind are, as a precaution, kept in hand under mattresses in order in the case of a catastrophe to fix the reclining patient on the mattress to be lying down and to then be able to pull the mattress on the rescue underlay over the ground. A single person can then rescue a patient, whereas in the case of use of stretchers or the like at least two persons are required per rescued person.

The rescue underlay from which the invention proceeds (DE 88 14 414 U1) comprises an underlay mat of a reticular or gridlike woven fabric of plastic, to which a pull loop of a plastic woven fabric strip for pulling the underlay mat inclusive of mattress and patient is attached at one end. Patient securing belts, which have connecting elements at both ends for closing the patient securing belts, are attached to the longitudinal sides of the underlay mat. In the case of the previously explained prior art these connecting elements are simple loops; other prior art mentions VELCRO hook and loop connections (U.S. Pat. No. 4,124,908A) and quick-action clamping locks or quick release buckles (GB 1 434 832 A).

The known rescue underlays have already proved themselves in the respect that a patient lying on the mattress and secured and held by the patient securing belts under his cover can be drawn in problem-free manner over the ground by a helper by means of the pull loops. Even pulling in stairwells has proved possible, so that such a rescue underlay in fact offers a considerable advantage in emergency situations.

It is already known to provide a rescue underlay of the conventional kind with additional, cushioning support wedges, particularly at the head end, at the foot end and in the middle region, which are arranged under the mattress and are to prevent slipping of the patient on the mattress (WO 00/74785 A1).

It has proved that the known rescue underlays for mattresses still present a need for improvement in handling.

SUMMARY OF THE INVENTION

The teaching of the present invention solves the previously outlined problem, in the case of a rescue underlay for mattresses with the features of the introductory part of claim 1, by the features of the characterising part of claim 1.

According to the invention the plastic flat material, which forms the rectangular underlay mat, is not simply a plastic woven fabric or plastic net material, but a flat material providing a spring travel. In other words, the underlay mat as such consists of a plastic material which itself has a certain cushioning function, because this material as such provides a spring travel, even if relatively small overall by comparison with the mattress. The spring constant of the plastic flat material will usually be substantially greater than the spring constant of the mattress itself. The underlay mat thus forms a relatively hard spring, where against the mattress forms a softer spring. This combination has proved to be advantageous for the transport problem present here.

Various materials can be used as plastic flat material providing a spring travel. Use can obviously be made of foam materials, air-bubble films or plastic materials which find use in foam mattresses. In that case, however, of particular significance is the fact that the requisite tensile strength has to be achieved in longitudinal direction of the underlay mat. Further, certain safety features must be achieved like e.g. flame-resistance or the like.

Of particular significance, therefore, is a preferred embodiment of the rescue underlay according to the invention which is characterised in that the plastic flat material providing a spring travel is a spacer woven fabric or, in particular, a spacer knitted fabric. A spacer woven fabric is a material which has two fabric cover layers which are held at a spacing of a few millimetres by distance-maintaining bridge threads (information from the company Haufler Industrievertretungen). Spacer knitted fabrics have textile outer surfaces of greater width of stitch link, the outer surfaces being connected by spacer threads and held at the desired distance. The spring characteristic of a spacer woven fabric or a spacer knitted fabric results from the spacer threads or bridge threads (data from Textilinstitut Greiz).

Further preferred refinements and developments moreover form the subject of further subclaims.

One embodiment relates to a specific way to secure the patient securing belts to the rescue underlay when they are not in use in a way enabling tearing off of the free ends if necessary.

Another embodiment, also a separate invention relating to the rescue underlay for mattresses, relates to a particular way to accommodate the patient securing belts when not in use. This is done in tunnel-like receptions preferably on the underside of the underlay mat as explained in this claim. Further subclaims related to this claim describe refinements.

Finally, it is explained that it is possible to permanently attach such rescue underlay to a mattress or even integrate a rescue underlay into a mattress. So part of the invention is a complete rescue mattress integrating the describe rescue underlay as well.

BRIEF DESCRIPTION OF THE DRAWINGS

The invention is explained in more detail in the following by reference to a drawing illustrating merely a preferred example of embodiment. In the drawing

DETAILED DESCRIPTION OF THE INVENTION

The subject of the invention is a rescue underlay for mattresses as has been described in the general part of the description.

Figure 1:
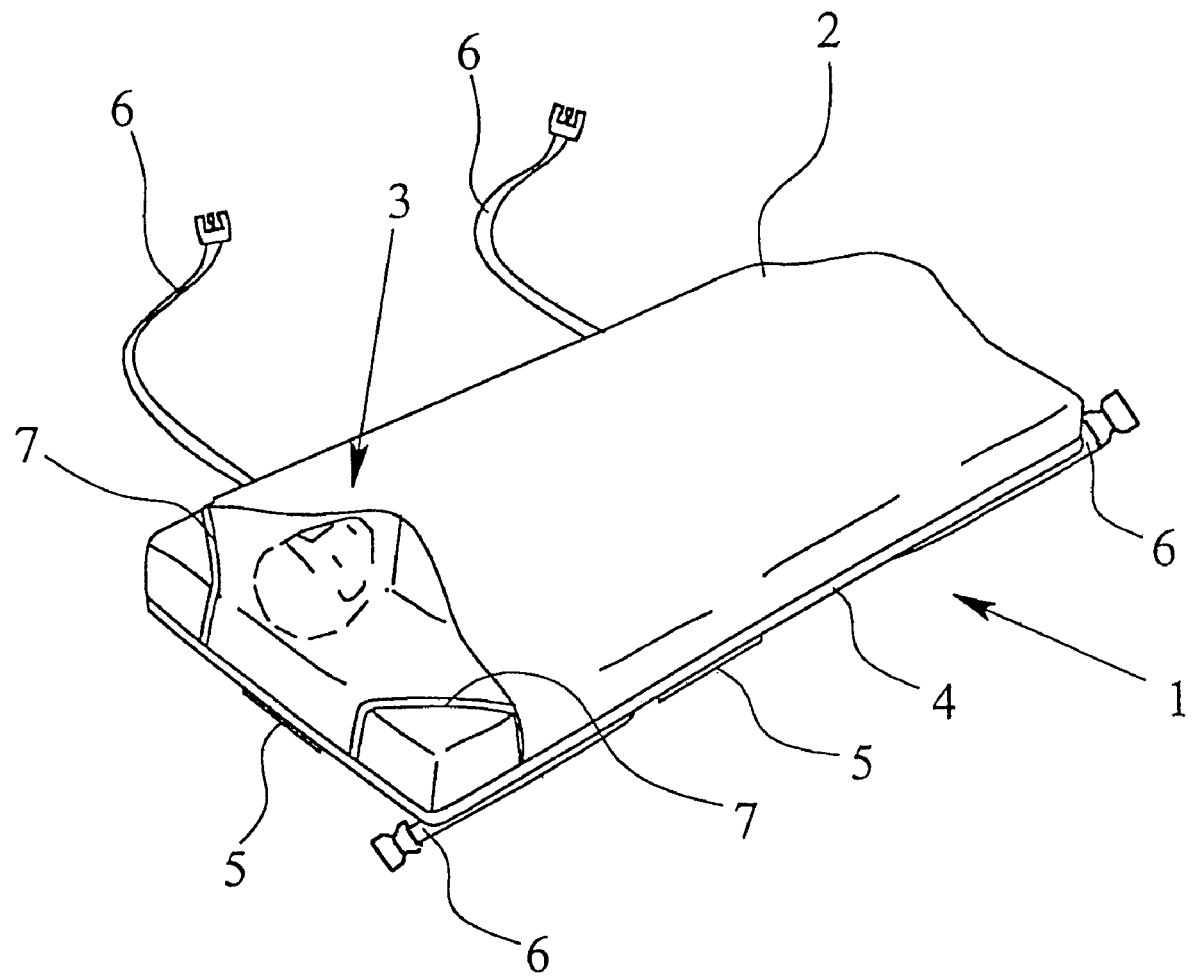
FIG. 1 shows, in a perspective illustration, a rescue underlay for a mattress, which is here illustrated with a patient lying thereon.

FIG. 1 shows a mattress 1 on which a patient 3, covered by a cover 2, lies. Disposed under the mattress 1 is a rescue underlay with a rectangular underlay mat 4 consisting of a plastic flat material which has a high tensile strength and is preferably substantially tear-proof. The underlay mat 4 has approximately the dimensions of the mattress 1. Obviously it is possible in principle for the underlay mat 4 to be somewhat larger or somewhat smaller, particularly somewhat longer or somewhat shorter, than the mattress 1. However, it could also be imagined that there are different underlay mats 4 adapted to respectively differently sized mattresses 1.

Since in the field of hospitals, homes for the elderly and nursing homes the dimensions of mattresses 1 are largely uniform, it is usually possible to manage with an underlay mat 4 of a specific format.

Figure 2:
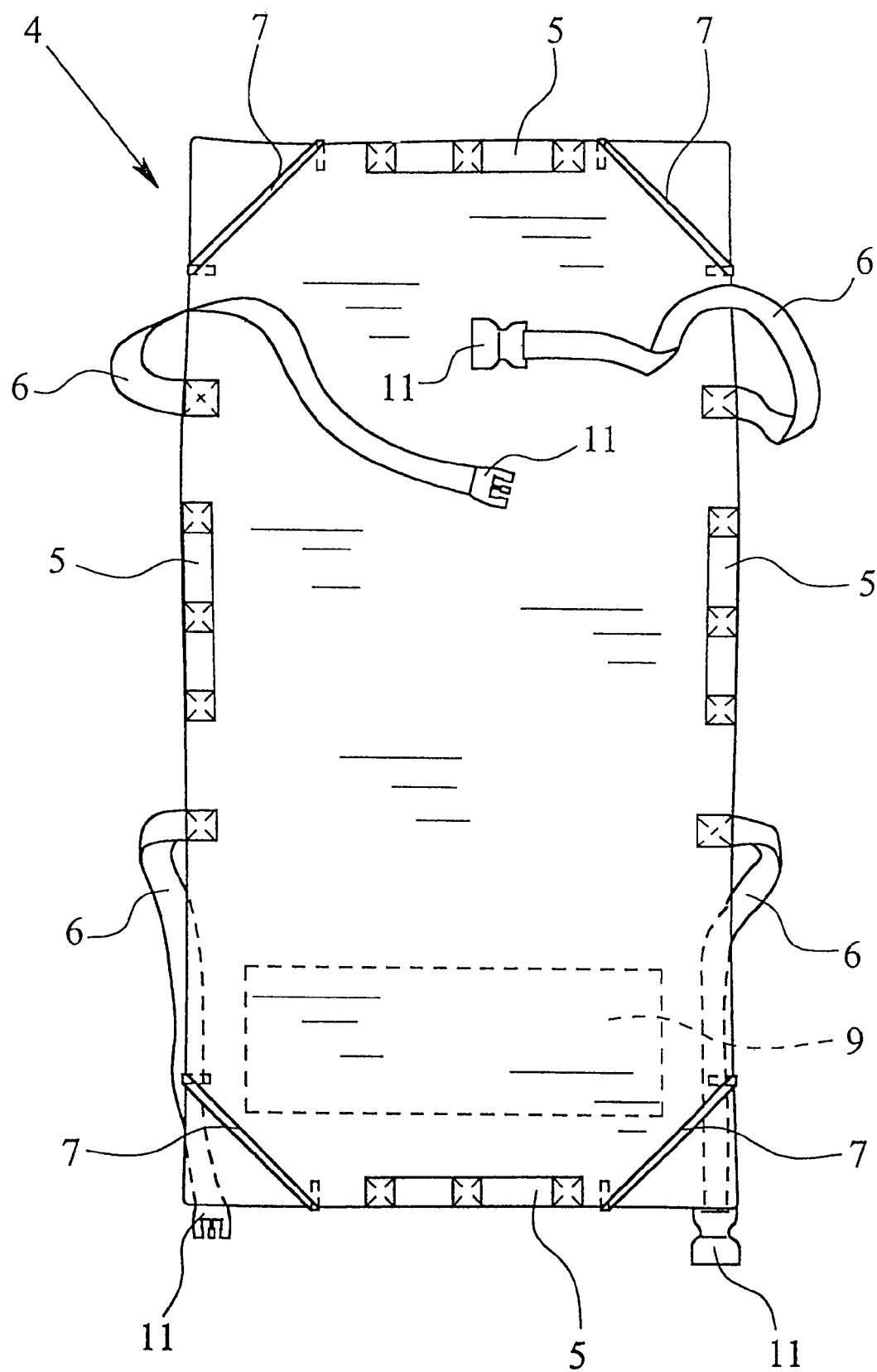
FIG. 2 shows an embodiment of a rescue underlay according to the invention.

The underlay mat 4 serves, for the mattress 1, initially as a mattress protective cover. To that extent the underlay mat 4 has a classic function. Beyond that, this underlay mat 4 also serves as a rescue means in emergency, as has been described in the general part of the description. For that purpose the rescue underlay is provided with pull loops 5, patient securing belts 6 and mattress retaining bands 7 attached to the underlay mat 4 (FIG. 2). The pull loops 5 are disposed directly adjacent to one another at the edge of the underlay mat 4 at both ends, so that the underlay mat 4 can be pulled in problem-free manner in both directions. The orientation of the underlay mat 4 under the mattress 1 thus does not matter.

Other pull aids, for example longer hand loops such as shown in U.S. Pat. No. 5,150,487A, can also be used instead of pull loops 5.

The patient securing belts 6 can also be arranged and connected in different mode and manner, the prior art showing a plurality of possibilities to which reference has already been made above.

Finally, it is recommended to also connect the underlay mat 4 of the rescue underlay in whatever manner to the mattress 1 itself. The illustrated mattress retaining bands 7 arranged at an angle in the corners correspond with that also realised in the state of the art from which the invention proceeds. Other prior art techniques show VELCRO hook and loop bands or additional belts.

Figure 3:
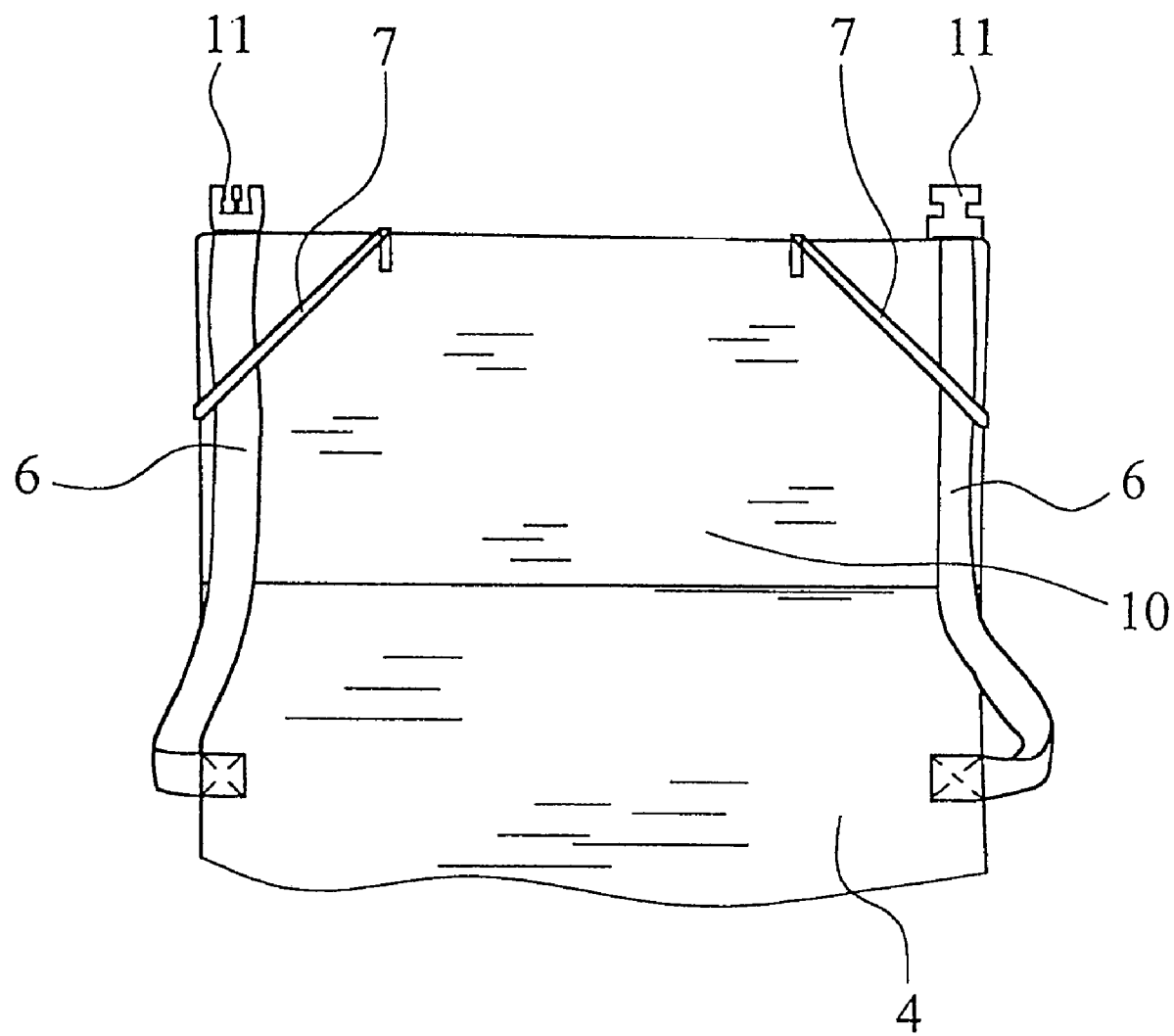
FIG. 3 shows a head region of a rescue underlay according to FIG. 2, FIG. 4a and show a spacer knitted fabric as is preferably used as flat material FIG. 4b providing a spring travel, in section.

FIGS. 2 and 3 show the rescue underlay according to the invention in enlarged illustration and without mattress 1. FIGS. 4a and 4b permit recognition of a section through the utilised plastic flat material of the underlay mat 4. To that extent the teaching of the invention is now to the effect that the plastic flat material of the underlay mat 4 is a flat material providing a spring travel. The advantages of a flat material, which itself provides a spring travel, as underlay mat 4 reside in the fact that an additional spring travel is provided, thus an additional cushioning takes place which is felt to be very comfortable by the transported persons in the case of transport.

A number of alternatives have been mentioned in the general part of the description for the plastic flat material providing a spring travel. In particular, sponge materials, air-bubble films or plastic materials such as used for foam mattresses come to mind for this purpose. However, with consideration of the requisite high tensile strength of the plastic flat material the illustrated, preferred form of embodiment of the rescue underlay according to the invention exhibits, as plastic flat material, a spacer woven fabric or a spacer knitted fabric. Spacer woven fabrics and spacer knitted fabrics are known as such from the state of the art. Their use is of particular advantage in the illustrated rescue underlay. Reference may be made to the cited references mentioned in the general part of the description with regard to spacer woven fabrics and spacer knitted fabrics.

It is recommended, for the present purpose of use, that the spacer woven fabric or spacer knitted fabric has a thickness of 4 mm to 20 mm, preferably approximately 6 mm to approximately 14 mm, especially of 6 mm or of 10 mm or of 14 mm. With regard to a spacer woven fabric of 6 mm, reference may be made to a technical data sheet of Müller-Textil GmbH, Industriestrasse 8, 51674 Wiehl, for the article 5754-0600 with a thickness of 6.0 mm or for the article 5556-1000 for a material of the thickness of 10.0 mm.

Spacer knitted fabrics of Müller Textil GmbH have, for example, the technical data sheet for the article 5900-1000 for a material with 10 mm thickness. In general, reference may be made here to the web page of the company Müller Textil GmbH.

Spacer knitted fabrics and spacer woven fabrics have become known, in particular, from polyester material. Polyester is also a selection of interest for other plastic materials which provide a spring travel.

Moreover, for the definition of the plastic flat material for the underlay mat 4 a flame-resistant or even fire-proof material is preferred. Moreover, it is considered an advantage that a non-decaying material is used. It is advisable that the material should not be hygroscopic, in order to keep the mattress dry. This is an advantage for cleaning of the rescue underlay, too. Apart from the above mentioned polyester material a polyamide fiber material, in particular an aramide fiber material (trade name Kevlar), a glass fiber material or a saran fiber material is a reasonable choice (the description of the different materials can be found in RÖMPP "Chemie", 10. edition 1996-1999, Georg Thieme Verlag Stuttgart, New York.

The embodiment illustrated in FIGS. 4a and 4b moreover show that in accordance with preferred teaching of the invention the flat material providing a spring travel, in particular the spacer woven fabric or spacer knitted fabric, has at the underside a closed plastic film coating 8 preferably of polyurethane material or polyester material, which has a low sliding friction, preferably a lower sliding friction than the plastic flat material itself. In FIG. 4a) this coating is illustrated at the top and FIG. 4b) shows the normal cover layer at the top. In the illustrated embodiment there is provided a polyurethane coating which is sealed, non-water-permeable, washable and readily capable of being disinfected as well as preferably, air-permeable. The sliding friction of such a coating is so low that the rescue underlay can be easily pulled over smooth floor coverings. This facilitates transport of the patient by rescue personnel.

Different demands are imposed on the slidability of the rescue underlay. On a flat path, the lowest possible sliding friction shall be present. However, this can lead to the consequence that on a sloping path or on stairs the rescue underlay can slip too quickly, which prejudices handling of the rescue underlay by the rescuer. According to a further and preferred teaching which is indicated in connection with FIG. 2, it can be provided that the plastic flat material has on the underside, especially on the film coating 8, at least an area with higher sliding friction which can as a braking surface 9. In the illustrated and preferred embodiment it is provided that the braking surface 9 is arranged in at least one end region of the underlay mat 4. Preferably a braking surface 9 is arranged at the underside of the underlay mat 4 in each end region of the underlay mat 4, particularly on the film coating 8.

The arrangement of the braking surface 9 at the indicated locations is based on the recognition that an end region of the underlay mat 4 during pulling of the rescue underlay by a rescuer is inevitably raised from the ground. The braking surface 9 here is ineffective. The other end region of the underlay mat 4 is less strongly loaded than the middle region of the underlay mat 4, because in the other end region either the head or the feet of the patient 3 is or are disposed according to the respective position of the patient 3. The heavier middle region of the patient 3, which ensures high friction by high force of pressing on the ground, is disposed therebetween. By raising the rescue underlay together with the mattress 1 and the patient 3 a rescuer on the stairs or on a sloping piece of ground can more strongly load the braking surface 9 at the opposite end in intended manner so that the braking effect increases. In particular, this is more or less automatically the case on stairs.

FIG. 3 moreover shows that in the illustrated example of embodiment it is further provided that an additional layer 10 of a flat material providing a spring travel, particularly a spacer woven fabric or a spacer knitted fabric, is fixedly attached, in particular sewn, glued and/or welded, to the underlay mat 4, preferably at the underside in an end region. The additional layer 10 of a flat material providing a spring travel is, in particular, similarly a spacer woven fabric or spacer knitted fabric, preferably such with a somewhat greater thickness.

FIGS. 2 and 3 of the drawing allow particularly clear recognition that the illustrated rescue underlay is also particularly advantageously designed with respect to the furnishing of the patient securing belt 6 in the rest state. This is a different and indepent advantage of the present rescue underlay. It is provided, in particular, that the patient securing belts 6 are placed at the edge of the underlay mat 4 and connected at the free ends thereof with the material of the underlay mat 4 by stitching or by means of VELCRO hook and loop connections in a way enabling tearing off of the free ends if necessary. At the ends of the closure elements 11 the patient securing belts 6 are here fastened to the underlay mat 4 by a few stitches. Thus, the patient securing belts 6 are normally accommodated in virtually invisible manner under the mattress 1, but nevertheless can be quickly separated at the ends by tearing off from the underlay mat 4 in order to fix the patient 3.

Figure 5:
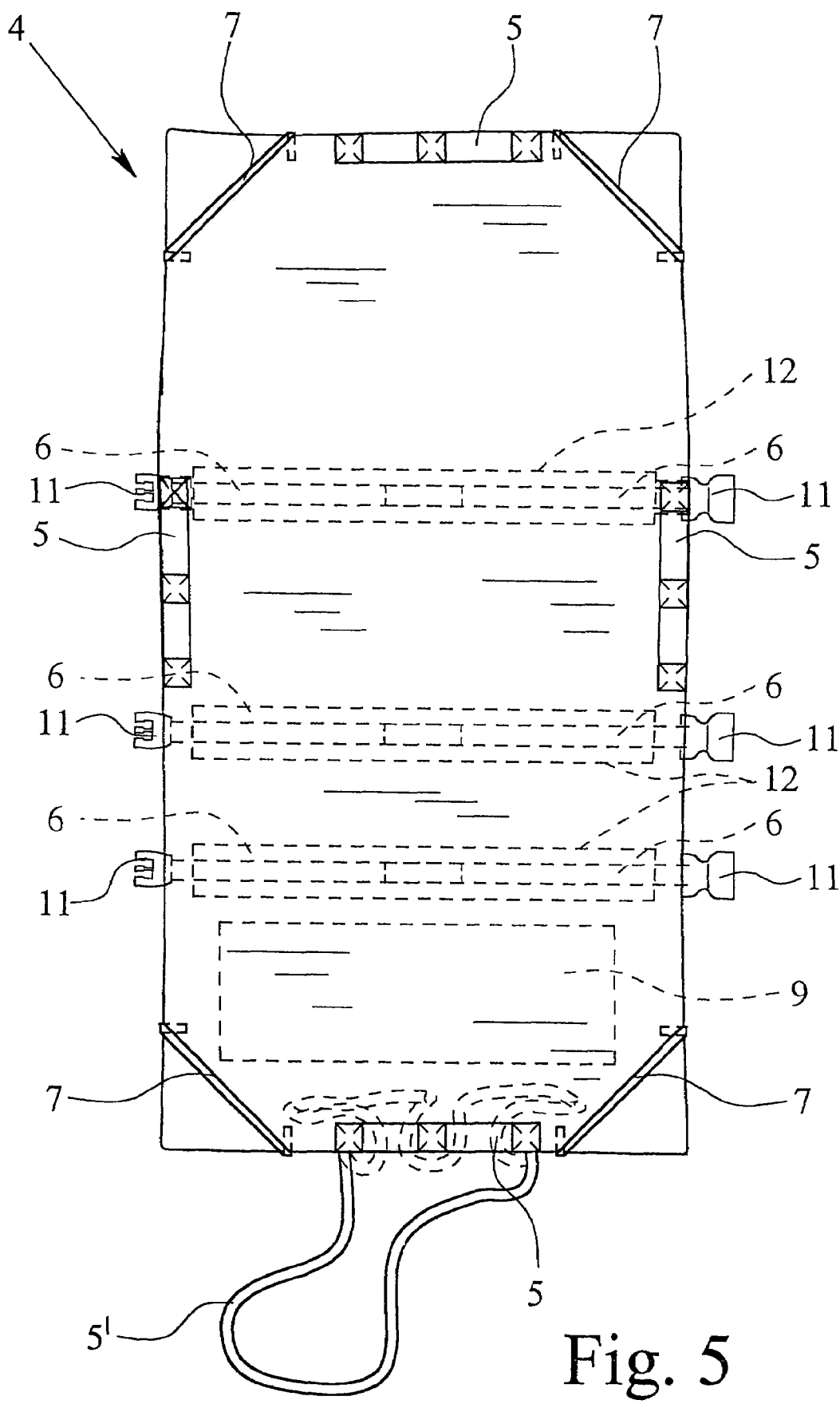
FIG. 5 shows a second embodiment of a rescue underlay according to the invention in a plan view.

FIG. 5 shows an embodiment of the rescue underlay with an underlay mat 4 providing in addition to the pull loops 5 at the edge of the underlay mat 4 a longer end pull loop 5' at the head end. FIG. 5 shows the hand pull loop 5' extended and, in dashed lines, in its non-used position. In this position it is inserted between the pull loops 5 under the underlay mat 4. By means of the extended hand pull loop 5' the head end underlay mat 4 can be managed by a rescuer for example when transporting a patient downstairs, without the rescuer necessarily bending to much.

Pull loops 5 should have a sufficient gripping width so that a rescuer with thick safety gloves can easily grip the pull loops 5.

Safety regulations in particular in Germany explain that safety relevant parts, in particular the closure elements 11 of the quick action and quick release buckles for the patient securing belts 6 should preferably be in blue colour.

The embodiment shown in FIG. 5 has a particular design in that the underlay mat 4, preferably on its underside is provided with tunnel-like receptions 12 accommodating the patient securing belts 6, wherein the patient securing belts 6 when not in use are positioned within the tunnel-like receptions 12 lengthwise, wherein one end of the respective patient securing belt 12, in particular a closure element 11 at the end of the patient securing belt 12, is protruding from the tunnel-like reception 12 such that it can be easily located and gripped in a rescue situation.

In this embodiment it is provided that the tunnel-like receptions 12 are positioned substantially transversely to the underlay mat 4. The embodiment shows that one tunnel-like reception 12 houses both parts of the patient securing belt 6. In a rescue situation the parts can be drawn from the tunnel-like reception 12 in opposite directions so that the closure elements 11 on the ends of the parts can be connected to secure the patient 3 on the mattress 1. However, an alternative is to house each part of a patient securing belt 6 in its own tunnel-like reception 12.

Further it is provided here that the tunnel-like receptions 12 are connected to the underlay mat 4 by sewing, in particular to the underside thereof. In the case that an additional layer is positioned on the underside of the plastic flat material to form a plastic film coating 8 it may be an option to use this plastic film coating 8 to form the tunnel-like receptions 12 on the underside of the underlay mat 4 by means of respective darts.

The embodiment of FIG. 5 discloses the quick connecting systems as closure elements 11 on the patient securing belts 6.

The embodiment of FIG. 5 further discloses that here the rescue underlay comprises altogether three patient securing belts 6 positioned in different distances from the head end of the underlay mat 4, wherein those distances preferably are about 50 cm, about 80 cm and about 120 cm.

In FIG. 5 the pull loops 5 are shown to be attached to the underlay mat 4 from the upper side. Of course, they can be attached to the underlay mat 4 from the underside as well if this is to be preferred from a handling standpoint. Such option is disclosed in FIG. 1.

Figure 6:
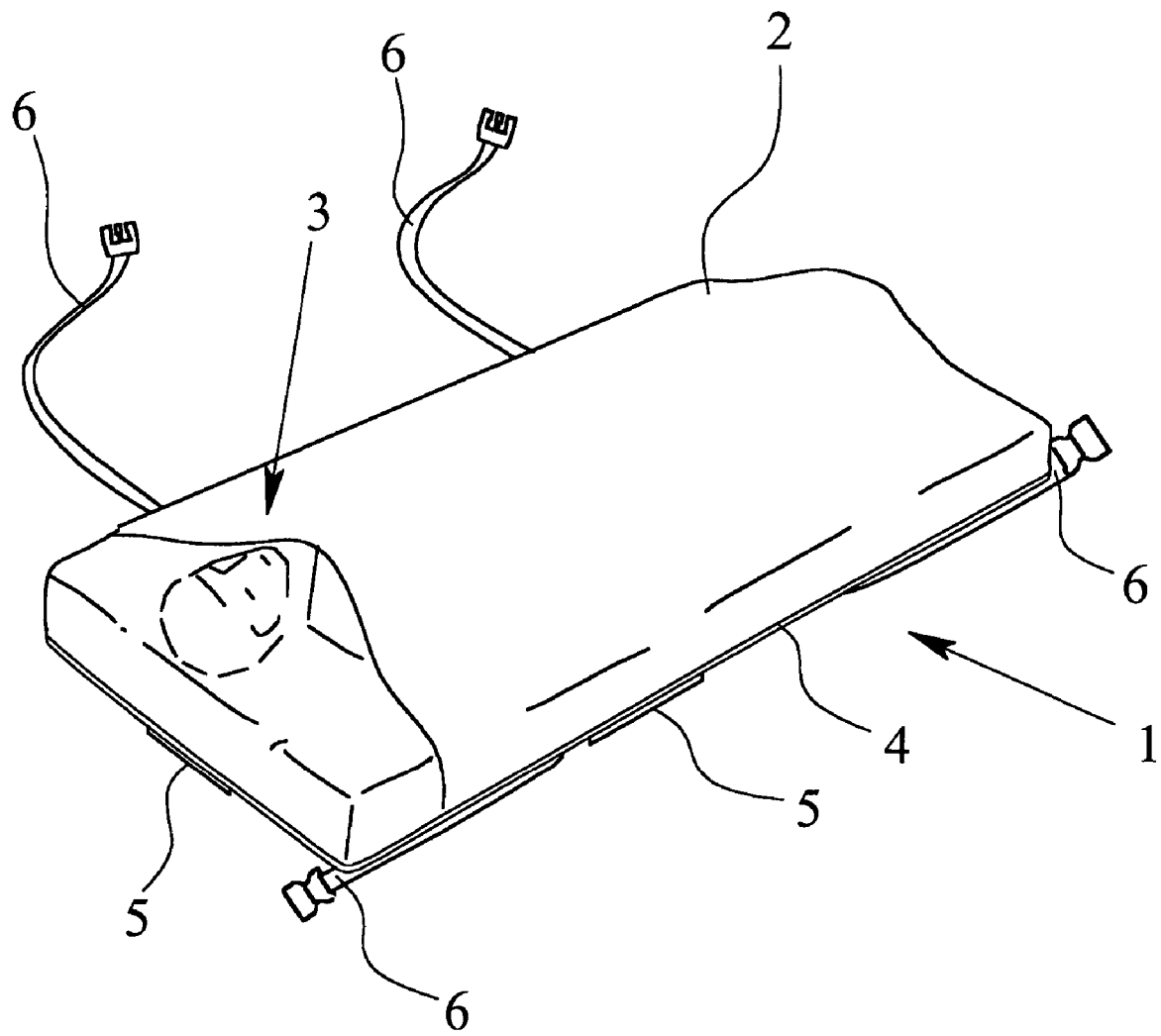
FIG. 6 shows a third embodiment in that a mattress with a rescue underlay according to the invention permanently affixed to it or integrated into it.

Finally, there is provided a mattress characterised in that a rescue underlay, preferably according to any one of the claims 1 to 14 is permanently affixed to the mattress or is integrated into the mattress. This is then a kind of "rescue mattress" as such. This is indicated with the integrated mattress shown in FIG. 6.

The invention claimed is:

1. A rescue underlay for a mattress comprising:
   a. a substantially flat material comprising spacer woven fabric having at least two layers spaced apart by bridge threads and providing spring travel, wherein the material is substantially the size of a mattress, and wherein the spacer woven fabric is a spacer knitted fabric;
   b. at least one pull member; and
   c. at least one patient securing belt.

2. The underlay of claim 1, further comprising at least one mattress retaining band.

3. The underlay of claim 1, wherein the material comprises plastic.

4. The underlay of claim 1, wherein the spacer woven fabric is a spacer knitted fabric.

5. The underlay of claim 1, wherein the spacer woven fabric has a thickness from about 4 mm to about 20 mm.

6. The underlay of claim 1, wherein the material is selected from the group consisting of flame resistant material, fire-resistant material, non-decaying material, non-hygroscopic material, polyester material, polyamide material, aramide material, glass fiber material, saran material, or combination thereof.

7. The underlay of claim 1, wherein the material further comprises a braking surface, wherein the braking surface exhibits a higher sliding friction than the material.

8. The underlay of claim 1, wherein the patient securing belt is attached to the underlay mat by an attachment selected from the group consisting of sewing and hook and loop connections.

9. The underlay of claim 1, wherein the underlay further comprises tunnel-like receptions for accommodating the patient securing belt when the patient securing belt is not in use.

10. The underlay of claim 9, wherein the tunnel-like receptions are positioned substantially transversely to the underlay.

11. The underlay of claim 9, wherein the tunnel-like receptions are sewed onto the underlay.

12. The underlay of claim 9, wherein the tunnel-like receptions are located on the underside of the underlay.

13. The underlay of claim 1, wherein the underlay has three patient securing belts.

14. The underlay of claim 1, wherein the underlay is permanently affixed to a mattress.

15. The underlay of claim 1, wherein the underlay is integrated into a mattress.

16. The underlay of claim 1, wherein the pull member is a loop.

17. The underlay of claim 1, wherein the material further comprises a coating on the underside.

18. The underlay of claim 17, wherein the coating is a plastic film.

19. The underlay of claim 18, wherein the plastic film is selected from the group consisting of polyurethane, polyester, and combination thereof.

20. The underlay of claim 18, wherein the plastic film exhibits a lower sliding friction than the material.

21. The underlay of claim 17, wherein the coating is water-impermeable.

22. The underlay of claim 17, wherein the coating is washable.

23. The underlay of claim 17, wherein the coating is air-permeable.

24. The underlay of claim 17, wherein the coating further comprises a braking surface, wherein the braking surface exhibits a higher sliding friction than the coating.

25. The underlay of claim 17, wherein the material comprises a plurality of layers of substantially flat material fixedly attached to each other.

26. The underlay of claim 17, wherein the coating is readily disinfected.

* * * * *